US012572823B2

(12) United States Patent
Daley et al.

(10) Patent No.:  US 12,572,823 B2
(45) Date of Patent:     Mar. 10, 2026

(54) MEASURING IMPACT OF EVENTS ON AFFINITY CLUSTER USING PROPENSITY DIMENSIONS

(71) Applicant: INTERNATIONAL BUSINESS MACHINES CORPORATION, Armonk, NY (US)

(72) Inventors: Stan Kevin Daley, Espanola, NM (US); Sandipan Sengupta, Kolkata (IN); Raman Harishankar, Blacklick, OH (US); Lucia Larise Stavarache, Columbus, OH (US); Charbak Chatterjee, Kolkata (IN); Chinmohan Biswas, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 17/540,917

(22) Filed: Dec. 2, 2021

(65) Prior Publication Data

US 2023/0177354 A1      Jun. 8, 2023

(51) Int. Cl.
G06N 5/022          (2023.01)
G06N 3/088          (2023.01)
(Continued)

(52) U.S. Cl.
CPC .............. G06N 5/022 (2013.01); G06N 5/04 (2013.01); G06Q 10/04 (2013.01); G06Q 10/06375 (2013.01); G06N 3/088 (2013.01)

(58) Field of Classification Search
CPC ...... G06N 5/022; G06N 20/00; C12Q 1/6883; G06Q 30/02; G06Q 10/10; G16B 20/00;
(Continued)

(56) References Cited

U.S. PATENT DOCUMENTS 10,037,545 B1 *   7/2018   Huang ............... G06Q 30/0246
10,535,081 B2     1/2020   Ferreira
(Continued)

FOREIGN PATENT DOCUMENTS

CN        106980692 B    * 12/2020    ............. G06F 16/35
JP        2017182341 A     10/2017
(Continued)

OTHER PUBLICATIONS

Y. Mei, et al. "Maximizing the Effectiveness of Advertising Campaigns on Twitter," 2017 IEEE International Congress on Big Data (BigData Congress), Honolulu, HI, USA, 2017, pp. 73-80 <https://ieeexplore.ieee.org/document/8029311?source=IQplus> (Year: 2017).*
(Continued)

*Primary Examiner* — Jerry O'Connor
*Assistant Examiner* — Michael R Koester
(74) *Attorney, Agent, or Firm* — Harrity & Harrity, LLP

(57)          ABSTRACT

A system and method including building propensity inclination dimensions of an affinity cluster, the propensity inclination dimensions maintained at a group profile level of the affinity cluster, identifying next best priority signals based on influencing events to determine a next best priority, applying a predictive algorithm to derive an influencing index, which is used to determine a tolerance level of the affinity cluster, deriving a duration of time of the tolerance level, and determining a critical mass of the affinity cluster required to achieve an objective of an organization.

20 Claims, 6 Drawing Sheets

(51) Int. Cl.
  *G06N 5/04* (2023.01)
  *G06Q 10/04* (2023.01)
  *G06Q 10/0637* (2023.01)

(58) Field of Classification Search
  CPC ....... G06F 16/2228; G06F 9/50; C07K 16/00; A61P 31/12
  See application file for complete search history.

(56) References Cited

U.S. PATENT DOCUMENTS

| | | | | |
|---|---|---|---|---|
| 10,650,432 | B1 * | 5/2020 | Joseph | G06N 3/08 |
| 11,605,042 | B1 * | 3/2023 | Perez | G06Q 30/0603 |
| 2015/0194007 | A1 | 7/2015 | Skoler | |
| 2020/0303074 | A1 | 9/2020 | Mueller-Wolf | |
| 2020/0342472 | A1 * | 10/2020 | Coffman | G06N 20/00 |

FOREIGN PATENT DOCUMENTS

| | | | |
|---|---|---|---|
| KR | 101279421 | B1 | 6/2013 |
| WO | WO-2015118455 | A1 * | 8/2015 ......... G06Q 10/0637 |

OTHER PUBLICATIONS

Mell, Peter et al.; "The NIST Definition of Cloud Computing;" National Institute of Standards and Technology; Special Publication 800-145; Sep. 2011; 7 pages.
Shi et al., Event Detection and User Interest Discovering in Social Media Data Streams, accepted Feb. 16, 2017, date of publication Mar. 1, 2017, date of current version Oct. 25, 2017. Digital Object Identifier 10.1109/ACCESS.2017.2675839, 12 pages.
Mekonnen, et al., Linking products to a cause or affinity group: Does this really make them more attractive to consumers?, European Journal of Marketing, Feb. 2008, 20 pages.
Yang et al., User Interest and Social Influence Based Emotion Prediction for Individuals, MM'13, Oct. 21-25, 2013, Barcelona, Spain, Copyright 2013 ACM 978-1-4503-2404-5/13/10, 4 pages.
Systems Simulation: The Shortest Route to Applications, Site launched in Feb. 11, 1995, National Science Foundation, http://home.ubalt.edu/ntsbarsh/simulation/sim.htm, 36 pages.

* cited by examiner

MEASURING IMPACT OF EVENTS ON AFFINITY CLUSTER USING PROPENSITY DIMENSIONS

BACKGROUND

Companies tend to analyze effects of events after the event occurred.

SUMMARY

An embodiment of the present invention relates to a method, and associated computer system and computer program product for event impact prediction. A processor of a computing system builds propensity inclination dimensions of an affinity cluster, the propensity inclination dimensions maintained at a group profile level of the affinity cluster. Next best priority signals are identified based on influencing events to determine a next best priority. A predictive algorithm is applied to derive an influencing index, which is used to determine a tolerance level of the affinity cluster. A duration of time of the tolerance level is derived. A critical mass of the affinity cluster required to achieve an objective of an organization is determined.

DETAILED DESCRIPTION

Figure 1:
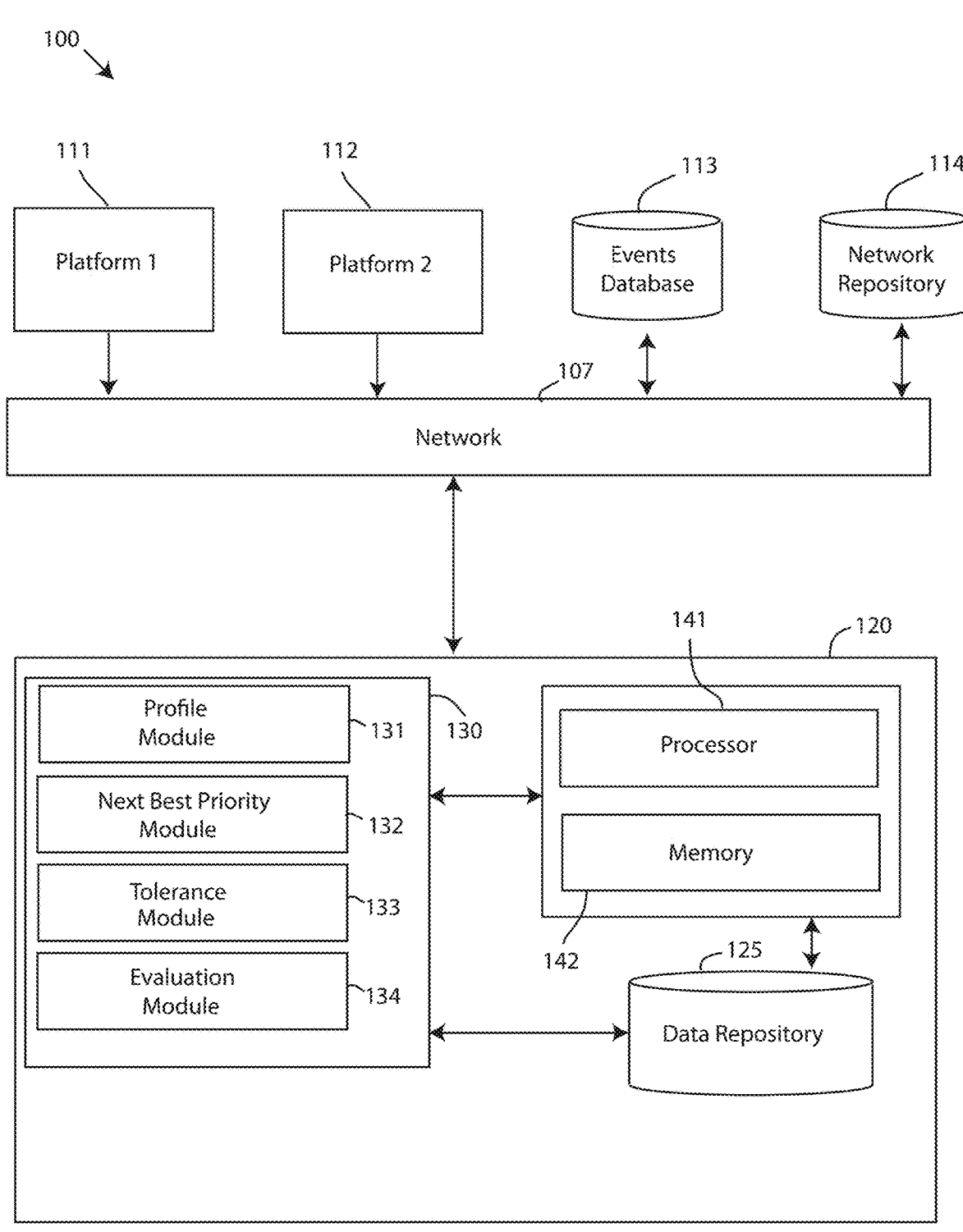
FIG. 1 depicts a block diagram of an event impact prediction system, in accordance with embodiments of the present invention.

In brief overview, embodiments of the present invention include a method and system to design an affinity cluster based on a controlled set of propensity inclination dimensions. The system can design an affinity cluster based on an anonymization method and algorithm using propensity inclination dimensions as control variable to optimize a cardinality of the group. Predictive algorithms are applied to design affinity clusters with optimum cardinality resulting in optimum target influencing events. For instance, embodiments of the present invention can predict how long an influencing event's impact will remain active without any other event happening to the affinity cluster. The impact on a structure and linkage strengths of the affinity cluster is measured before and after the influencing event. An influencing event is any event originated from social, professional or other spaces, occurrence of which will have impact on the construct of the affinity cluster over a certain period of time after occurrence. In social computing, events are identified from associated concepts, and the concepts are also associated with propensity inclinations of the affinity cluster.

Affinity clusters are groups based on a common gain propensity that, understanding the impact of the propensity and duration of influence of the event, provides insights on whether the affinity cluster will remain after one or more influencing events, as well as domain impact changes. Affinity clusters are groups that have some affinity among the cluster members. The information processed for the cluster members are categorized in multiple dimensions and practically they may be structured as well as unstructured data. The domain of information is mainly related to subjective propensity inclination. These clusters are applicable for but not limited to any group, social cluster or corporate cluster that voluntarily and anonymously participate in many events; the events may be focused towards achieving defined goals. As an example, a group has a propensity on travel, the impact over the group's core propensity in view of an influencing event can fully dissolve the group or break down the propensity; the impact will not be on the group solely but on all the dependent tangential inferences. Further, embodiments of the present invention can forecast a recovery time for an affinity cluster from an impact to neutral position or to growth by finding an optimal cardinality of the next best priority to reconstruct the affinity cluster structure and performance.

Embodiments of the present invention applies a predictive algorithm to derive an influence level of the focused affinity cluster under an influence of certain influencing event, based on an influencing index. The influencing index is a new propensity inclination dimension of the affinity cluster, and is defined as a distance between two consecutive next best priorities, correlated under two or more consecutive influencing events and other correlated propensity values of the affinity cluster. The influence level and a duration of the influence over the affinity cluster is predicted, for example, how long the affinity cluster will remain influenced by an event correlated to a next best priority. Next best priorities are any event or activity that can occur in immediate future that might have priority or importance to member(s) of an affinity cluster. In social computing, next best priorities will be identified as concepts and associated events by processing next best priority signals detected from social communications, surveys etc. Next best priorities are correlated to events and hence are associated to concepts and correlated propensity inclination.

Moreover, an influencing activity period for an affinity cluster is determined by predicting a threshold value of change of the influencing index, as a result of ripple effect from plurality of influencing events. A regression analysis is performed for the influencing activity period for a correlated influencing event, next best priority, and correlated propensity inclination dimensions that can be used as controlled dimensions. An output of the regression analysis can be used for designing a new focused affinity cluster or group at the end of the influencing activity period under certain influencing events.

Embodiments of the present invention can also recognize and predict potential reciprocal impact to an organization and/or the affinity cluster over a plurality of events, based on propensity inclinations of affinity cluster from non-controlled dimensions. An overall deviation of the affinity cluster from a defined goal of an organization and event re-prioritization based on propensity inclinations of the affinity cluster from controlled dimensions can be performed to realign with the organization's strategic goal and vison.

An overall impact from the deviation is predicted along with an escape duration to maintain the communication ecosystem by classifying the influencing event and trigger action to protect assets or attributes of an organization. Further, the system derives and classifies communication-based inclination categories identifiable via color theme and threshold value to build awareness of the affinity cluster about potential consequence. The foregoing can be used to forecast and simulate impact of an event(s) across an affinity cluster, for example, by measuring the impact and forecasting the affinity cluster's recovery time to a specific target and simulate the affinity cluster's structure and connections. After each event that impacts an affinity group, the connections within the affinity group can become stronger, or the affinity cluster can lose its critical mass and dissolve or revert back to a neutral position.

Embodiments of the present invention can also forecast linkage strengths and improvise with feedback post impact of event across an affinity cluster. Linkage strength is a propensity Inclination dimension which is applicable for any affinity cluster. Linkage strength determines and controls an affinity cluster structure based on influencing factors and probability of a change in the influencing factor. For instance, the influencing index of each dimension for event, occurring in a close vicinity of an affinity cluster is calculated, in combination with a probability of next influencing event within an optimum time window; this changes the influencing index by a minimum threshold which equates to the linkage strength.

FIG. 1 depicts a block diagram of an event impact prediction system 100, in accordance with embodiments of the present invention. The event impact prediction system 100 is a system for predicting an impact of one or more events will have on a specific affinity cluster based on a propensity and/or inclination of the affinity cluster at a group level. The event impact prediction system 100 may be useful for organizations looking to implement a shift in the organization, such as a new business model, revenue generation, human resource operations, etc.

The event impact prediction system 100 includes a computing system 120. Embodiments of the computing system 120 include a computer system, a computer, a server, one or more servers, a backend computing system, and the like.

Furthermore, the event impact prediction system 100 includes one or more platforms 111, 112 that are communicatively coupled to the computing system 120 over a network 107. For instance, information/data, such as node information/attributes of a knowledge graph, is transmitted to and/or received from the neural network 110 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture. The information output by the platforms 111, 112 is transmitted to the computing system 120 via data bus lines connected to the processor 141 of the computing system 120.

In an exemplary embodiment, the network 107 further comprises, in addition to the computing system 120, a connection to one or more network-accessible knowledge bases 114, which are network repositories containing information relating to affinity clusters, influencing events, influencing indexes, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the affinity cluster outcomes due to various influencing events, and the like, to generate both historical and predictive reports regarding a particular affinity cluster. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The computing system 120 is configured to extract information from the platforms 111, 112. The platforms 111, 112 can be organization-specific collaboration platforms, social media platforms, publicly accessible databases, and the like. The platforms 111, 112 accessible over network 107.

The computing system 120 also includes an events database 114. The events database 114 is a database containing information regarding specific influencing events that occur in the real-world.

Referring still to FIG. 1, the computing system 120 of the event impact prediction system 100 is equipped with a memory device 142 which stores various data/information/code, and a processor 141 for implementing the tasks associated with the event impact prediction system 100. An event impact prediction application 130 is loaded in the memory device 142 of the computing system 120. The event impact prediction application 130 can be an interface, an application, a program, a module, or a combination of modules. In an exemplary embodiment, the event impact prediction application 130 is a software application running on one or more back end servers (e.g. computing system 120).

The event impact prediction application 130 of the computing system 120 includes a profile module 131, a next best priority module 132, a tolerance module 133, and an evaluation module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The profile module 131 includes one or more components of hardware and/or software program code for building propensity inclination dimensions of an affinity cluster. The propensity inclination dimensions maintained at a group profile level of the affinity cluster. For instance, member forming affinity cluster volunteer to participate in providing feedback via surveys, which allows the profile module 131 to build the profile of the affinity cluster relating to a propensity of the group. Further, the profile module 131 accesses information about the members of the affinity cluster from the one or more platforms 111, 112, with prior authorization from the members of the affinity cluster. The data collected via survey and from the one or more platforms 111, 112 is anonymized so that an entity deploying the event impact prediction application 130 will not know the identity or personal information of the members of the affinity cluster. The profile is maintained at a group level for the predictive algorithms.

In an exemplary embodiment, the profile module 131 builds the following table (Table 1):

| FocusGroup | Members | ValuSystemDim | NextBestPrioritySignal |
|---|---|---|---|
| SEG$_1$ | M$_1$ | PrPi$_1$[. . .] | NBPs$_1$ |
| SEG$_2$ | M$_2$ | PrPi$_2$[. . .] | NBPs$_2$ |

Figure 2:
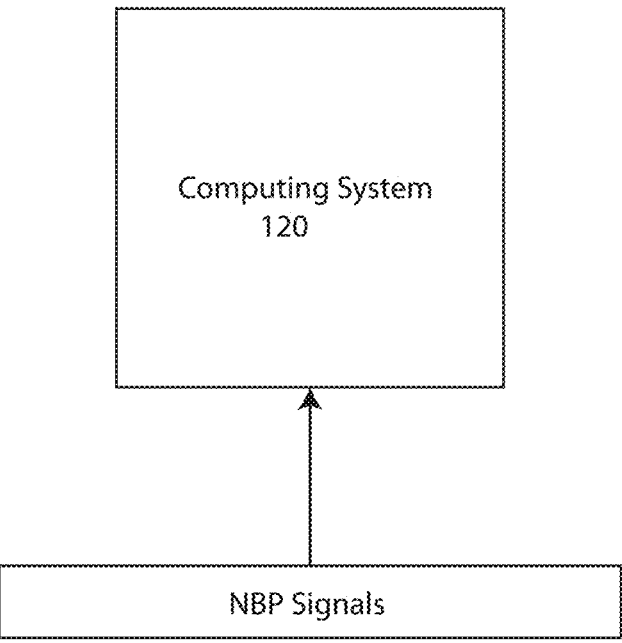
FIG. 2 depicts a system view for a next best priority signal, in accordance with embodiments of the present invention.

The next best priority module 132 includes one or more components of hardware and/or software program code for identifying next best priority signals based on influencing events to determine a next best priority. Events/data processes through propensity system derive matrices with next best priority signals collected over the one or more platforms 111, 112; the propensity dimensions at focus/socio-economy group level, which can be continuously performed by the next best priority module 132. The next best priority module 132 leverages one or more matrices of next best priority signals, as shown in FIG. 2. The next best priority signals are extracted from the one or more platforms 111, 112 or survey/feedback and are based on the propensity inclination to various influencing events. Matrices are developed for the affinity cluster with positive inclination towards propensity diminution, influence index and escape time until which the event sustained is no longer relevant to the affinity cluster.

As an example, the next best priority module develops the affinity cluster SEG(1) . . . SEG(n) using ML technique based on the propensity to affinity cluster segment and event vector. The following table is created (Table 2):

| SEG | Dim | Inclination(+ve) | InfluencingIndex | EscapeTime |
|---|---|---|---|---|
| SEG$_1$ | PrPi$_1$ | 34 | .89 | T$_1$ |
| SEG$_2$ | PrPi$_2$ | 65 | .75 | T$_2$ |

Referring back to FIG. 1, the tolerance module 133 includes one or more components of hardware and/or software program code for applying a predictive algorithm to derive an influencing index, which is used to determine a tolerance level of the affinity cluster. For instance, the tolerance module 133 derives the event influence (influence index) on dimension based on the next best priority signals from the affinity cluster, in combination with projected optimized duration of time that the influence will sustain (i.e. tolerance level) and continues to keep the affinity cluster relevant to the event prospective, see Table 2. The tolerance module 133 re-assembles the profiles within the affinity cluster for anonymization and develops propensity inclination dimensions and associated affinity to dimension classes. The following equation (Equation 1) can be used for re-assembling the profiles:

$$f(seg) = \sum_{i=1}^{n} (PrPi[i])$$

The tolerance module 133 utilizes a machine learning regression model with cost function evaluated against inclination (for control dimension percentile for incoming events), escape time (tolerance level) to derive most optimal critical mass for focus groups in plurality of targeted events (Ev). This optimization will be performed inconsideration with influencing Index and Escape Time as well at propensity inclination of the focus group. Function parameter dimensions inclination hypothesis value PrPih$_\emptyset$ for Event Ev$_i$EscapeTime,NBP frequency for Ev where Dimension are {'artisty', 'Ethics', 'Optimist', d4, d5 . . . } using f("PrPihø", Eti,NBPf,PrPi[n]) Applied cost function $$\left\{ \frac{1}{m} \sum_{k=1}^{m} \left( PrPih[i]_\phi - PrPi[i] \right) \right\}^2$$

within passing hypothesis value and actual ones. This optimization can be performed on the Influencing Index and EscapeTime as well. The following table (Table 3) is created:

| SEG[anonymize] | ControlDimension | Event | EscapeTime | criticalMass |
|---|---|---|---|---|
| SEG[i] | Cheerfulness | Ev[1] | T$_1$ | Cnt1' |
| SEG[i] | Altruism | Ev[2] | T$_2$ | Cnt2' |
| SEG[i] | Calm under pressure | Ev[n] | T$_3$ | Cnt3' |

Based on escape time, a tolerance level is re-assessed to contextualize relevant target event maps against reassembling the affinity focus group.

The tolerance module 133 also derives a duration of time of the tolerance level. For example, the tolerance module 133 will find an optimum time window to in which it captures a complex sequence of events En (n may be restricted to 3 min to 5 max, as a non-limiting example). The tolerance module 132 calculates the influencing index of each dimension for event En in combination with a probability of next event within an optimum time window tn+1 that can change the influencing index by a minimum threshold THm. This can determine linking strength (LS). In this context, base value of linkage strength on the onset of events will be extrapolated from influence index initially derived based on propensity inclination for control dimensions. The linkage strength will further extemporize through this method. Now, the Cardinality N of a SEG, whose influencing index is within a threshold distance of the influencing index of each dimension for event En will provide the optimum Group design. In scenario when influence index not within threshold level for target dimension have negative influence to SEG, in such scenario linkage strength will determine by combination of positive and negative influence index for targeted event. The following algorithm is to measure the linkage strength of the group before impact:

$$LSf( ) = (Infldx(En_1)*Infldx(e'_1)) + \ldots + (Infldx(En_n)*Infldx(e'_n))$$

| SEG | ControlDimension | Event | InfluencingIndex | SEG | ControlDimension | Event | LinkageStreanth |
|---|---|---|---|---|---|---|---|
| SEG[1] | Cheerfulness | $Ev_1$ | $Idx_1$ | SEG[1] | Cheerfulness | $Ev[1]$ | $Lst_1$ |
| SEG[1] | Altruism | $Ev_2$ | $Idx_2$ | SEG[1] | Altruism | $Ev[2]$ | $Lst_2$ |
| SEG[1] | Calm under pressure | $Ev_3$ | $Idx_3$ | SEG[1] | Calm under pressure | $Ev[n]$ | $Lst_3$ |

Post impact, it will measure based on measured strength of propensity with recorded feedback.

The evaluation module 134 of the computing system 120 includes one or more components of hardware and/or software program code for determining a critical mass of the affinity cluster required to achieve an objective of an organization. Positive intermittent reinforcement methods identify the effectiveness and affinity of the affinity cluster to specific targeted events and ramification to other propensity dimension with possible set of critical mass from anonymized group construct and can define other influencing events for this focus-group with optimum group members' critical mass. Positive intermittent reinforcement by reconstruct the affinity group based on inclination to towards events based on propensity inclination dimension and critical mass of aforesaid affinity cluster. Event design and orchestration based on the propensity inclination of the affinity cluster with Influence-Index within desired tolerance level for Event with time dimension and incoming next best priority signal frequency for specific affinity clusters with critical mass of user base on-n-above the threshold limit defined as per optimize critical mass acquired in earlier stage.

The following examples are intended to illustrate use cases of the event impact prediction system 100 and should not be considered limiting examples.

In a first example, an economic impact towards cluster members can be followed through in selling teams where participants are motivated via incentive and achievement of scorecards, without having additional interest among each other. Divisions of a company that are solely dependent on a single stream of revenue may experience a salary decrease, loss of hours or loss of job if the single revenue stream is disrupted. The event impact prediction system helps a company facing such events to better understand the steps taken and measure tolerance levels for such movements, achievement times, understand the linkage events to ultimate pick the next best priorities. Additionally, the insights the system is learning when a specific event happens can be used to simulate impact of other events and improve or take mitigation actions in advance.

In a second example, a company would like to rebrand and open a new line of business. These types of events naturally form affinity clusters and have members adhere to team either in sequence or in parallel for a specific duration of the achievement goal. Currently, companies do not have a way of measuring this organic impact across and while it happens; companies tend to analyze the effect after the action completed. The event impact prediction system 100 can empower HR divisions with mechanism of monitoring the strength of a formed affinity cluster after a company shift and what is the adherence (linkage strengthen), influence, critical masses and events duration to achieve the target goals. If the group is taking long to form or the group rapidly loses mass is a direct sign that the direction was not properly propagated into the resources population as they do not find a social economic goal or impact to form an affinity cluster or work towards the goal.

In a third example, advertising groups would like to understand specific populations of users and their affinities, e.g., competitions, segmentation of preferences, how to trigger interest and where to initiate an advertising effort. The event impact prediction system 100 can be used to measure influencing events, linkage, and duration to trigger creation of affinity clusters understand how to keep as many users in the affinity cluster.

Other examples include intelligent workflow for talent transformation, especially for sellers and AP's that are economically driven, intelligent recommendation system for the media industry on advertising effectiveness, virtual community of practices and online knowledge building, communities critical mass contribution, intelligent automated recommendation platform for designing and organizing event to promote content on OTT platform, increasing subscription revenue, building intelligence towards brand building and promotional events, and enriching AI offering with social communication intelligence.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Figure 3:
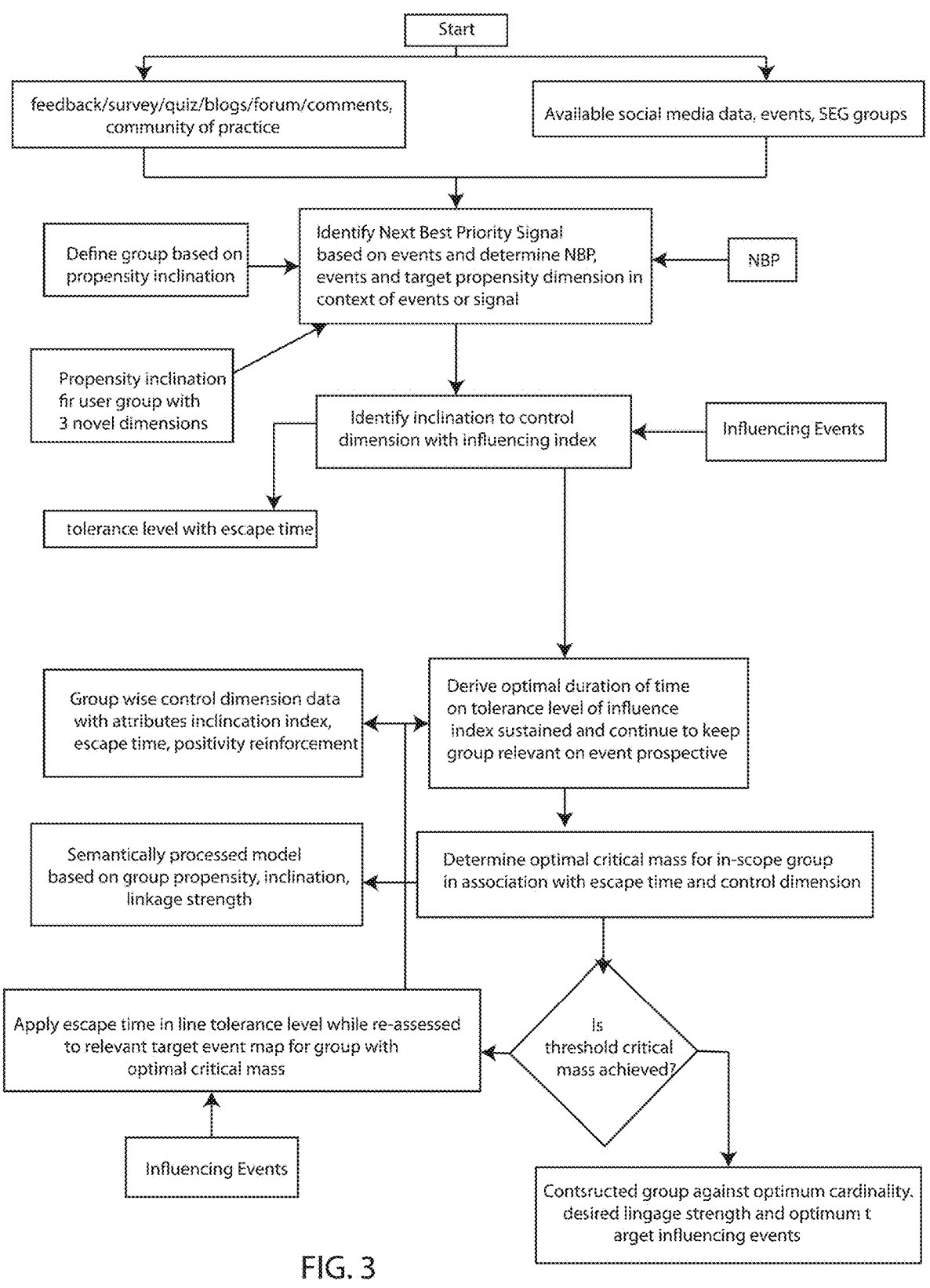
FIG. 3 depicts a flow chart of a method for event impact prediction, in accordance with embodiments of the present invention.

Referring now to FIG. 3, which depicts a flow chart of a method 300 event impact prediction, in accordance with embodiments of the present invention.

Figure 4:
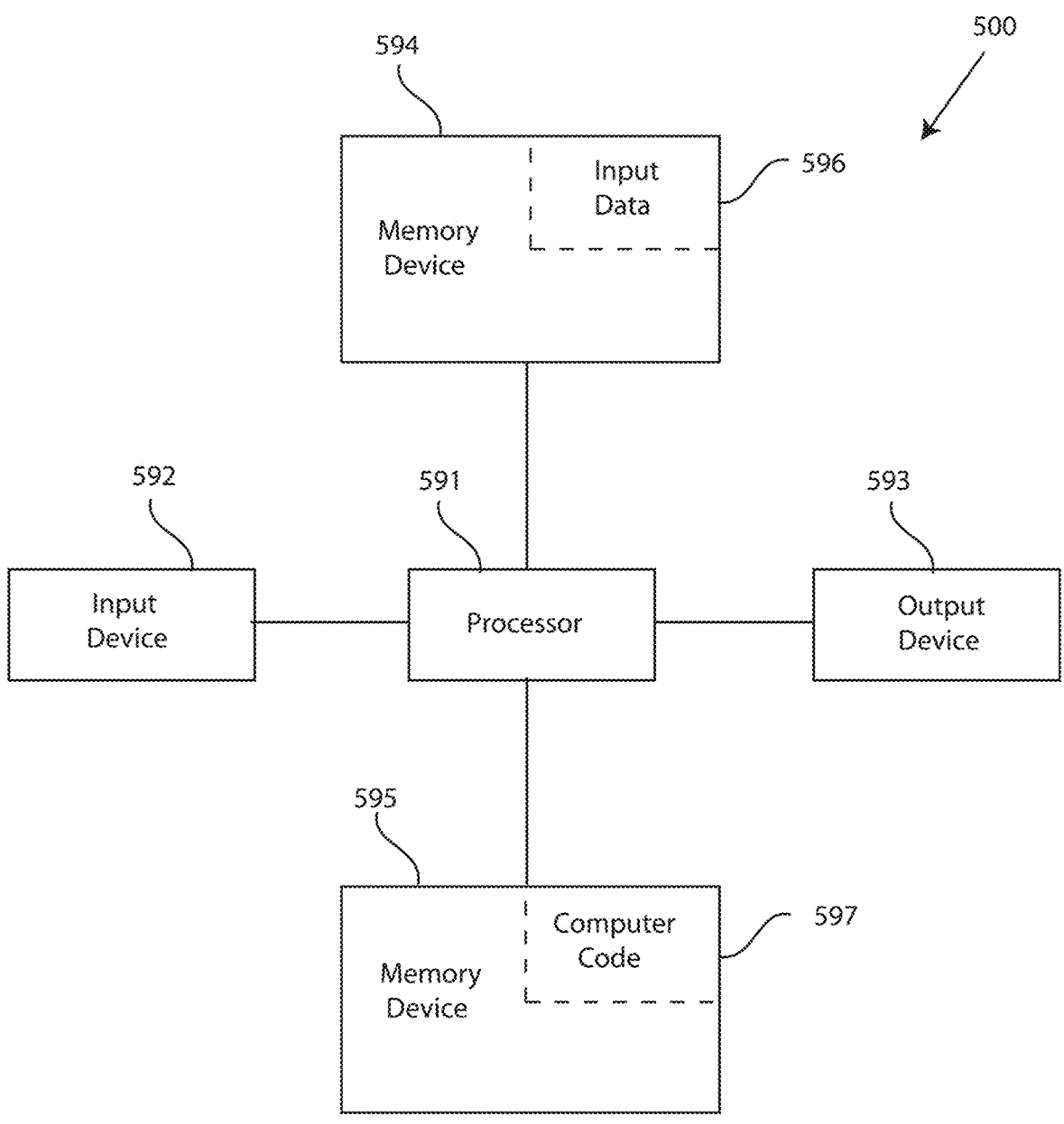
FIG. 4 depicts a block diagram of a computer system for event impact prediction of FIGS. 1-2, capable of implementing a method for event impact prediction of FIG. 3, in accordance with embodiments of the present invention.

FIG. 4 depicts a block diagram of a computer system for the event impact prediction system 100 of FIGS. 1-3, capable of implementing methods for event impact prediction of FIG. 3, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for event impact prediction in the manner prescribed using the event impact prediction system 100 of FIGS. 1-3, wherein the instructions of the computer code 597 may be executed by processor 591 via memory device 595. The computer code 597 may include software or program instructions that may implement one or more algorithms for implementing the method for event impact prediction, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 4.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to event impact prediction. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to extract information from tables. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for event impact prediction. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for event impact prediction.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
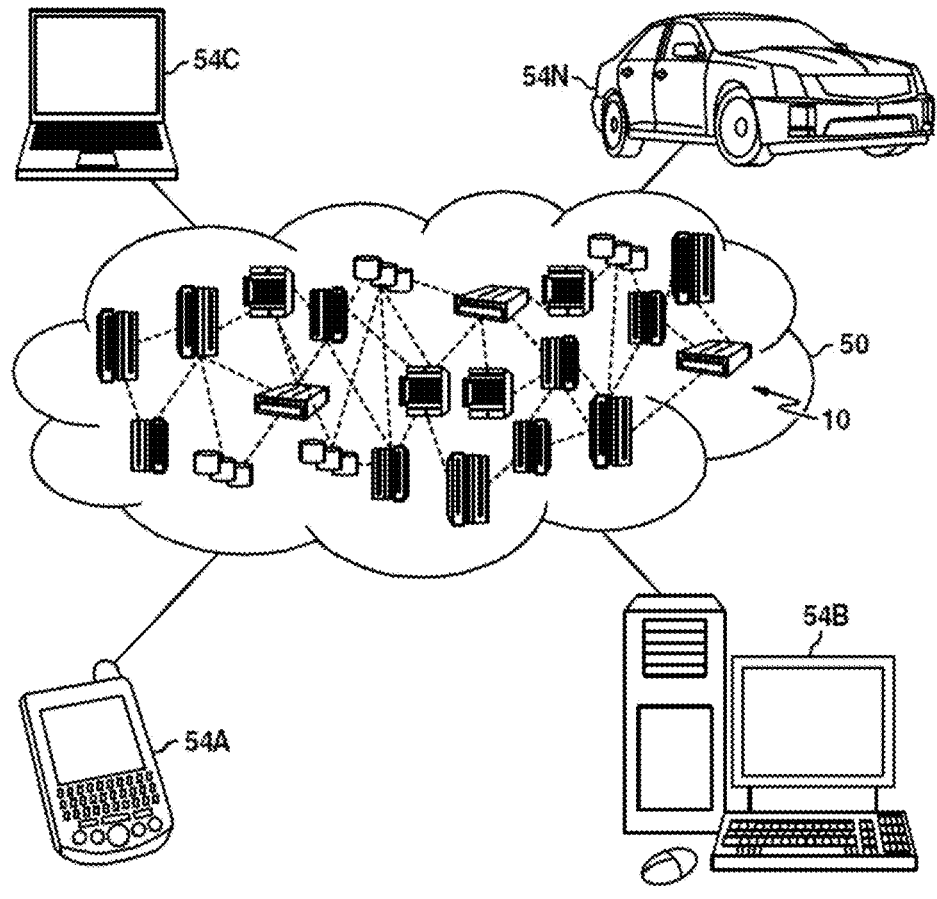
FIG. 5 depicts a cloud computing environment, in accordance with embodiments of the present invention.

Referring now to FIG. 5 illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
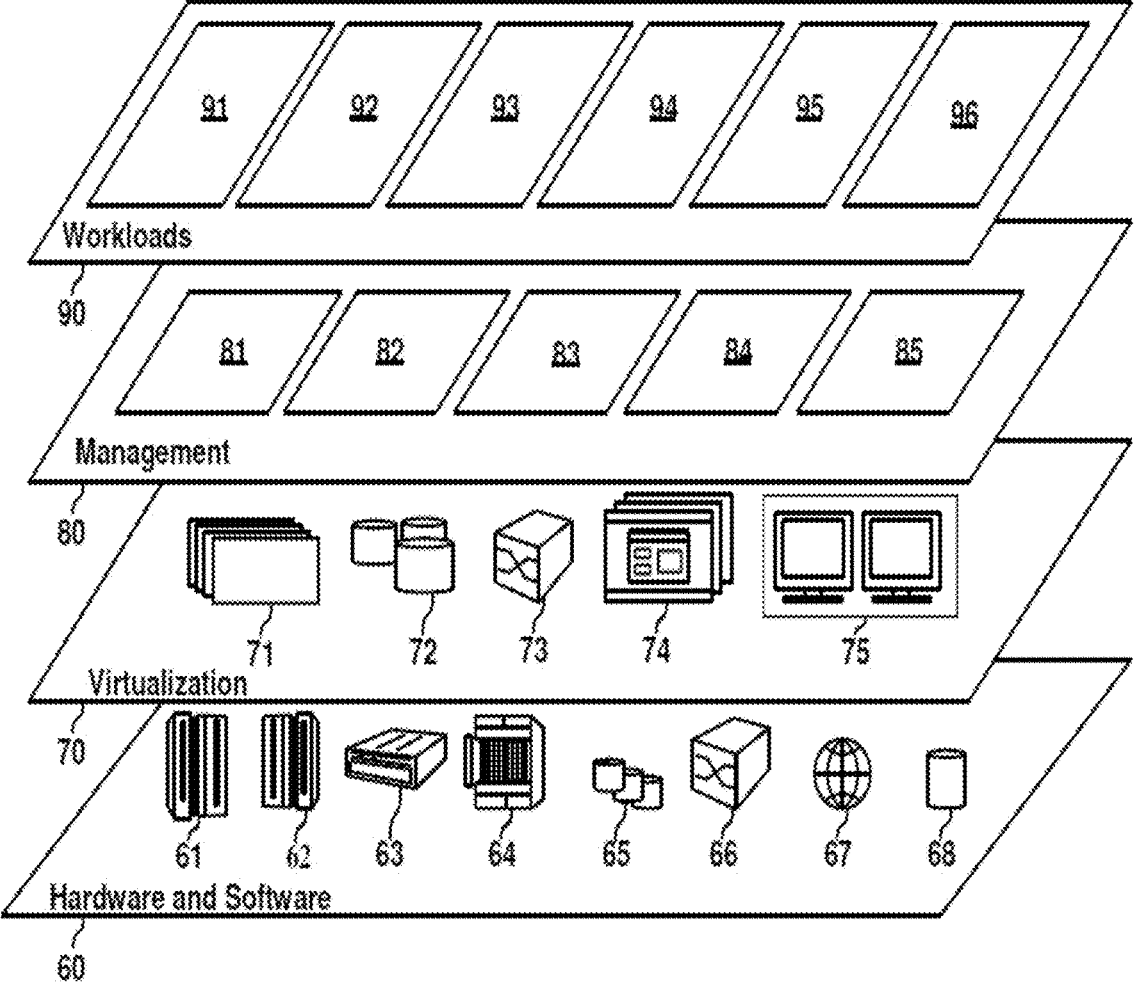
FIG. 6 depicts abstraction model layers, in accordance with embodiments of the present invention.

Referring now to FIG. 6 a set of functional abstraction layers provided by cloud computing environment 50 (see FIG. 5) are shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event impact prediction 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
building, by a processor of a computing system, propensity inclination dimensions of an affinity cluster, the propensity inclination dimensions maintained at a group profile level of the affinity cluster;
identifying, by the processor, next best priority signals based on influencing events to determine a next best priority;
applying, by the processor, a predictive algorithm to derive an influencing index, which is used to determine a tolerance level of the affinity cluster;
deriving, by the processor, a duration of time of the tolerance level;
determining, by the processor and using a machine learning model, a critical mass of the affinity cluster required to achieve an objective of an organization, wherein the machine learning model is based on a cost function to optimize the critical mass based on the propensity inclination dimensions;
predicting, by the processor, a potential reciprocal impact to the organization based on a propensity inclination of the affinity cluster from non-controlled dimensions, wherein an impact from a deviation of the affinity cluster from a defined goal is predicted;
simulating, by the processor, the impact from the deviation across the affinity cluster to forecast a recovery time to the defined goal; and
automatically triggering, by the processor, implementation of an incentive mechanism to mitigate the deviation of the affinity cluster or protect assets of the organization.

2. The method of claim 1, further comprising
determining, by the processor, an influencing activity period for the affinity cluster by predicting a threshold value of change of the influencing index, as a result of ripple effect from plurality of influencing events.

3. The method of claim 2, further comprising
applying, by the processor, a regression model for the influencing activity period, the next best priority, and the propensity inclination dimensions to determine controlled dimensions.

4. The method of claim 1, further comprising
determining, by the processor, a linkage strength using the influencing index of each propensity inclination dimension for the influencing events and a probability of a next influencing event within an optimum time window that can change the influencing index by a minimum threshold.

5. The method of claim 1,
wherein the next best priority is any future event or activity that can occur that might have priority or importance to the affinity cluster.

6. The method of claim 1,
wherein the influencing index is a distance between two consecutive next best priorities correlated under two or more consecutive influencing events and other correlated propensity values of the affinity cluster.

7. The method of claim 1, further comprising
determining, by the processor, an optimal cardinality of the next best priority to reconstruct the affinity cluster.

8. A computing system, comprising:
one or more processors; and
one or more memory devices coupled to the one or more processors, wherein the one or more processors are configured to:
build propensity inclination dimensions of an affinity cluster, the propensity inclination dimensions maintained at a group profile level of the affinity cluster;
identify next best priority signals based on influencing events to determine a next best priority;
apply a predictive algorithm to derive an influencing index, which is used to determine a tolerance level of the affinity cluster;
derive a duration of time of the tolerance level;
determine, using a machine learning model, a critical mass of the affinity cluster required to achieve an objective of an organization, wherein the machine learning model is based on a cost function to optimize the critical mass based on the propensity inclination dimensions;
predict a potential reciprocal impact to the organization based on a propensity inclination of the affinity cluster from non-controlled dimensions, wherein an impact from a deviation of the affinity cluster from a defined goal is predicted;
simulate the impact from the deviation across the affinity cluster to forecast a recovery time to the defined goal; and
automatically trigger implementation of an incentive mechanism to mitigate the deviation of the affinity cluster or protect assets of the organization.

9. The computing system of claim 8,
wherein the one or more processors are further configured to:
determine an influencing activity period for the affinity cluster by predicting a threshold value of change of the influencing index, as a result of ripple effect from plurality of influencing events.

10. The computing system of claim 9,
wherein the one or more processors are further configured to:
apply a regression model for the influencing activity period, the next best priority, and the propensity inclination dimensions to determine controlled dimensions.

11. The computing system of claim 8,
wherein the one or more processors are further configured to:
determine a linkage strength using the influencing index of each propensity inclination dimension for the influencing events and a probability of a next influencing event within an optimum time window that can change the influencing index by a minimum threshold.

12. The computing system of claim 8, wherein the next best priority is any future event or activity that can occur that might have priority or importance to the affinity cluster.

13. The computing system of claim 8, wherein the influencing index is a distance between two consecutive next best priorities correlated under two or more consecutive influencing events and other correlated propensity values of the affinity cluster.

14. The computing system of claim 8, wherein the one or more processors are further configured to:

determine an optimal cardinality of the next best priority to reconstruct the affinity cluster.

15. A non-transitory computer-readable medium storing a set of instructions for wireless communication, the set of instructions comprising:

one or more instructions that, when executed by one or more processors of a device, cause the device to:

build propensity inclination dimensions of an affinity cluster, the propensity inclination dimensions maintained at a group profile level of the affinity cluster;

identify next best priority signals based on influencing events to determine a next best priority;

apply a predictive algorithm to derive an influencing index, which is used to determine a tolerance level of the affinity cluster;

derive, using a machine learning model, a duration of time of the tolerance level;

determine a critical mass of the affinity cluster required to achieve an objective of an organization, wherein the machine learning model is based on a cost function to optimize the critical mass based on the propensity inclination dimensions;

predict a potential reciprocal impact to the organization based on a propensity inclination of the affinity cluster from non-controlled dimensions, wherein an impact from a deviation of the affinity cluster from a defined goal is predicted;

simulate the impact from the deviation across the affinity cluster to forecast a recovery time to the defined goal; and automatically trigger implementation of an incentive mechanism to mitigate the deviation of the affinity cluster or protect assets of the organization.

16. The non-transitory computer-readable medium of claim 15, wherein the one or more instructions cause the device to:

determine an influencing activity period for the affinity cluster by predicting a threshold value of change of the influencing index, as a result of ripple effect from plurality of influencing events.

17. The non-transitory computer-readable medium of claim 16, wherein the one or more instructions cause the device to:

apply a regression model for the influencing activity period, the next best priority, and the propensity inclination dimensions to determine controlled dimensions.

18. The non-transitory computer-readable medium of claim 15, wherein the one or more instructions cause the device to:

determine a linkage strength using the influencing index of each propensity inclination dimension for the influencing events and a probability of a next influencing event within an optimum time window that can change the influencing index by a minimum threshold.

19. The non-transitory computer-readable medium of claim 15, wherein the next best priority is any future event or activity that can occur that might have priority or importance to the affinity cluster.

20. The non-transitory computer-readable medium of claim 15, wherein the influencing index is a distance between two consecutive next best priorities correlated under two or more consecutive influencing events and other correlated propensity values of the affinity cluster.

\*　\*　\*　\*　\*